United States Patent
Chatterjee et al.

(10) Patent No.: US 7,162,691 B1
(45) Date of Patent: Jan. 9, 2007

(54) METHODS AND APPARATUS FOR INDEXING AND SEARCHING OF MULTI-MEDIA WEB PAGES

(75) Inventors: Raja Chatterjee, Nashua, NH (US); Suzan Mavris, Bedford, NH (US)

(73) Assignee: Oracle International Corp., Redwood Shores, CA (US)

( * ) Notice: Subject to any disclaimer, the term of this patent is extended or adjusted under 35 U.S.C. 154(b) by 384 days.

(21) Appl. No.: 09/496,086

(22) Filed: Feb. 1, 2000

(51) Int. Cl.
*G06F 5/00* (2006.01)

(52) U.S. Cl. ..................................... 715/513
(58) Field of Classification Search ................ 715/513, 715/512
See application file for complete search history.

(56) References Cited

U.S. PATENT DOCUMENTS

| | | | |
|---|---|---|---|
| 6,202,061 B1 * | 3/2001 | Khosla et al. | 707/3 |
| 6,243,713 B1 * | 6/2001 | Nelson et al. | 707/104.1 |
| 6,282,548 B1 * | 8/2001 | Burner et al. | 707/104.1 |
| 6,519,597 B1 * | 2/2003 | Cheng et al. | 707/10 |
| 6,549,922 B1 * | 4/2003 | Srivastava et al. | 707/205 |
| 6,571,295 B1 * | 5/2003 | Sidana | 709/246 |
| 6,665,659 B1 * | 12/2003 | Logan | 707/3 |
| 6,748,382 B1 * | 6/2004 | Mohan et al. | 707/10 |

OTHER PUBLICATIONS

Klemens Bohm & Thomas C. Rakow "Metadata for Multimedia Documents" SIGMOD Record, vol. 23, No. 4, Dec. 1994.*

* cited by examiner

*Primary Examiner*—Heather Herndon
*Assistant Examiner*—Michael K. Botts
(74) *Attorney, Agent, or Firm*—Roger Kennedy; Charles G. Call

(57) ABSTRACT

A system for automatically enhancing Web pages with annotations expressed in Extensible Markup Language (XML) which describes the pages' multimedia content. Each Web page is parsed or scanned to identify markup tags which contain the URLs of separately stored multimedia data (e.g. image, audio or video files). Each referenced multimedia data entity is then retrieved and analyzed by a type-specific process to extract metadata which describes its content. Additional descriptive metadata may be obtained from the referencing markup tag, accepted from a human editor, or fetched from operating system directories which provide access to the multimedia files. The resulting metadata is expressed in text-based XML format and inserted into a copy of the Web page to form an enhanced Web page whose multimedia content may then be processed by conventional text-based indexing and searching facilities.

17 Claims, 2 Drawing Sheets

METHODS AND APPARATUS FOR INDEXING AND SEARCHING OF MULTI-MEDIA WEB PAGES

FIELD OF THE INVENTION

This invention relates to electronic data storage, management and retrieval systems and more particularly to methods and apparatus for storing, indexing and searching data stored in and referenced by Web pages.

BACKGROUND OF THE INVENTION

The Internet, and particularly the World Wide Web, allows multimedia information to be globally disseminated. Web pages expressed in a hypertext markup language often integrate information expressed in natural language text with static images, audio and video presentations and information generated by executing identified programs. While widely used "search engines" provide the ability to search for desired information based on the textual content of Web pages, there is a need for improved methods and apparatus for indexing and searching the multimedia content which is incorporated into Web pages.

SUMMARY OF THE INVENTION

The present invention takes the form of methods and apparatus for first analyzing each Web page to be indexed to identify media data which are incorporated by reference into that Web page; then extracting information describing the media data thus identified from the referencing Web page, from the media file itself, and from other sources; then inserting the extracted information as text annotations into a copy of the original Web page used for indexing purposes, and finally presenting the annotated Web page for processing by conventional text-based Internet indexing and searching facilities. The resulting index with store the association between the original Web page and the metadata which describes that page's media data content.

In accordance with the invention, a media-specific parsing program may be advantageously used to extract metadata already stored in external media files or other media resources referred to in a Web page in accordance with the format specifications for that referenced data's particular media type. A media content processing program is also preferably executed to analyze the media data to generate additional text-based information which characterizes the content of the referenced media data. In addition, a further program may be executed to acquire auxiliary data from one or more sources external to the media data being described, including such sources as the Internet, keyboarded descriptions entered by the user, or information describing the media data contained in system directories.

As contemplated by the invention, after the metadata describing the media data is obtained, it is combined to form a set of textual annotations in a standard text-based representation, preferably using Extended Markup Language (XML). These annotations are inserted into a copy of the original Web page which contained the references to the media data and the resulting annotated Web page is then indexed using conventional text-based indexing and search engines.

These and other objects, features and advantages of the present invention may be better understood by considering the following detailed description of the preferred embodiment of the invention. In the course of this description, reference will frequently be made to the attached drawings.

DETAILED DESCRIPTION

Figure 1:
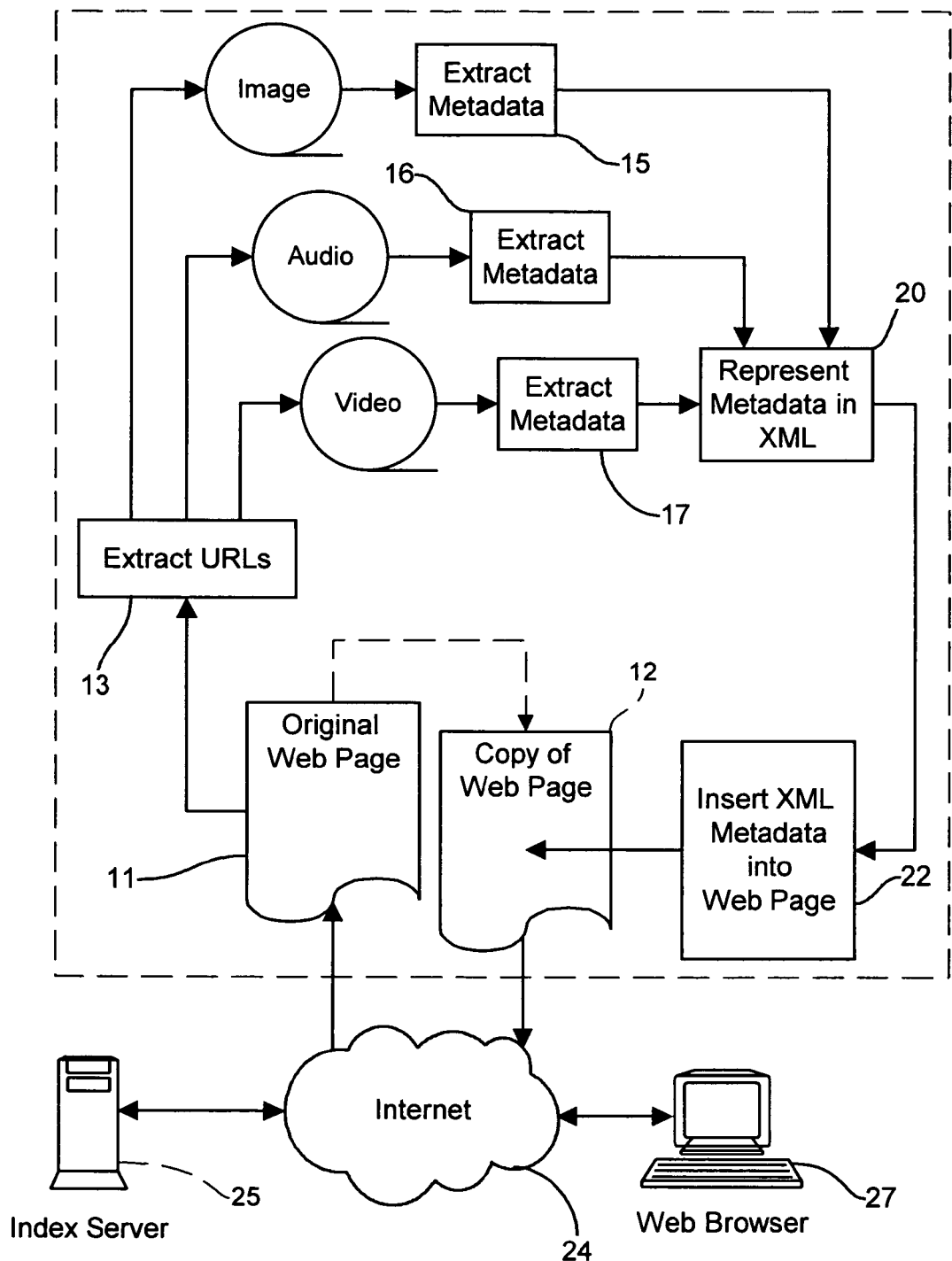
FIG. 1 is a block diagram illustrating the principle functions performed to implement the preferred embodiment of the invention.

In the description of a specific embodiment of the invention that follows, the terms "media data" and "multimedia data" include digital image, video and audio data, and is to be distinguished from character-based text data which may be readily indexed and managed by conventional text processing mechanisms. Data which describes media data are interchangeably referred to as "metadata" and "annotations," these terms being used interchangeably in the description which follows to identify a collection of indexable and/or manipulable attributes or properties expressed in natural language text (such at titles, media file attributes, file content descriptors, copyright notices, and the like).

The term "Web page" as used herein refers to an Internet addressable unit of data, such as a named file or data returned by an executable server program, which can be displayed by a Web browser program. The text data for Web pages are typically expressed in Hypertext Markup Language (HTML) but may also be expressed using the Structured Graphics Markup Language (SGML), or the Extended Markup Language (XML), all of which are character-based textual representations which may contain markup tags which identify non-text data, such as image, audio or video data, or program files. The markup tag typically contains the multimedia data's identifier, such as an Internet URL. Both Web pages and the media data which is incorporated by reference into the Web page are retrieved for presentation to a user from local storage using operating system file access routines, or from remote sources using a suitable request-response network communications protocol, such as the conventional HTTP/TCP-IP transmission mechanism used by the Internet World Wide Web facility.

HTML, in its preferred forms, as been defined in specifications which have continued to evolve to meet needs of users and developers. HTML 2.0 was developed under the aegis of the Internet Engineering Task Force (IETF) to codify common practice in late 1994 and is described in RFC 1866 (November, 1995). The efforts of the World Wide Web Consortium's HTML Working Group to codify common practice resulted in HTML 3.2 (January 1997). HTML 4.0, the latest version of which is currently available at the URL http://www.w3.org/TR/html40, extends HTML with mechanisms for style sheets, scripting, frames, embedding objects, and other enhancements.

The Extensible Markup Language (XML) is a subset of SGML which was designed to enable generic SGML to be served, received, and processed on the Web in the way that was previously possible with HTML. An XML document, as specified in the World Wide Web Consortium's Recommendation entitled "Extensible Markup Language (XML) 1.0" (February, 1998), may consist of one or many storage units called entities; all of which have content and which are typically identified by name. Each XML document has one entity called the document entity, which serves as the starting point for the XML processor and may contain the whole document. The XML specification permits an XML document to refer to one or more external entities by an appropriate identifier (URI) so that the content of the external entity referred to may be incorporated into the XML document. Entities may be either parsed or unparsed. An unparsed entity is a resource whose contents may or may not be text, and if text, may not be XML. Each unparsed entity has an associated notation, identified by name. Beyond a requirement that an XML processor make the identifiers for the entity and notation available to the application, XML places no constraints on the contents of unparsed entities, and XML documents may accordingly contain media data as unparsed data. XML documents may be translated into HTML using a suitable translator in accordance with cascaded style sheets (CSS) or the Extensible Style Language (XSL).

As used herein, the term "hypertext markup language" should accordingly be understood to include all of the evolving versions of HTML, as well as other character-based hypertext markup languages such as SGML and XML.

HTML's multimedia features allow authors to include images, applets (programs that are automatically downloaded and run on the user's machine), video clips, and other HTML documents in their pages. Commonly, in order to completely render a web page (i.e, to display all of the referenced text and images, as well as to play referenced sound, video or program files), it is necessary for the web browser program to scan the HTML text, identify the references to included resources that need to be fetched, and issue a sequence of separate requests using the Hypertext Transfer Protocol (HTTP) to obtain a current copy of each additional item of referenced data which may then be rendered by the browser or by a "helper" application capable of rendering data of a particular type. The rendering of an XML document may similarly require multiple HTTP request/response exchanges to assemble the entire document, including exchanges for fetching unparsed entities containing image, video, audio or program data which is rendered as part of the Web page.

Automatic Annotation of Web Pages

As contemplated by the present invention, Web pages are pre-processed to enrich them with text-based annotations which describe the multimedia data which is incorporated by reference into a copy of the original Web page which be used for indexing purposes. The index will maintain an association between the original Web page and the media-sensitive metadata. The additional metadata which is inserted into each Web page to describe its multimedia content may then be processed by conventional Web page indexing and searching software to allow multimedia data to be more readily located, presented to users, and otherwise processed.

The mechanism for automatically inserting searchable character-based annotations into a Web page which describe the multimedia component of that Web page is illustrated generally in FIG. 1 of the drawings. First, the Web page seen at 11 is automatically analyzed at 13 to identify the presence of markup tags which specify the URLs of external resources which supply multimedia content for the Web page 11.

The detection of one or more tags containing URLs which specify image data trigger processes which extract metadata from the identified image content as well as others sources as indicated 15. Similarly, markup tags containing URLs which identify audio or video data are processed as illustrated at 16 and 17 and respectively to extract metadata which describes each multimedia entity. As seen at 20, the extracted metadata is converted into annotations expressed in a character-based format suitable for processing by conventional Web page indexing and searching mechanisms. The annotations added to the copy 12 of the Web page 11 are preferably expressed in the Extended Markup Language (XML). These annotations are inserted at 22 into a copy 12 of the original Web page 11 to enhance its descriptive content before the copy 12 is indexed or published via the Internet 24. The information contained in the inserted annotations make that information available for indexing by existing search engines illustrated by the index server 25 in FIG. 1. Any authorized Internet user may employ a conventional Web browser 27 to communicate with the index server 25 to obtain the URL of Web page 11 by performing conventional keyword searches which employ search terms which characterize page 11's multimedia content. For example, a search might be conducted for Web pages which incorporate an audio rendition of "Stardust" or for Web pages that contain a JPEG image picturing a "dove" by using conventional search engines to identify web pages which contain the words "stardust" or "dove" respectively.

Figure 2:
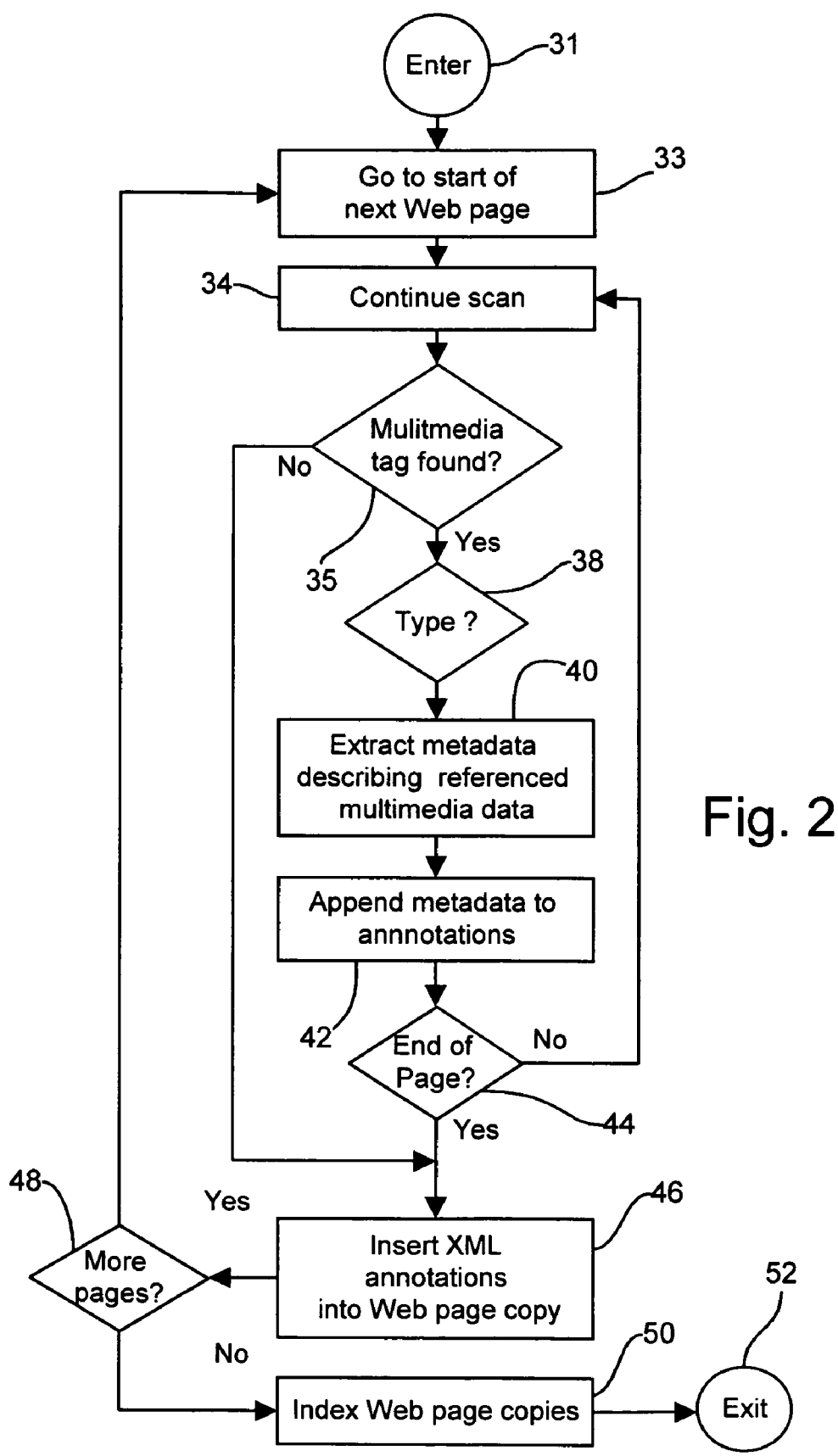
FIG. 2 is a flow chart illustrating the manner in which Web pages are scanned and annotated with metadata as contemplated by the invention.

The mechanism for automatically annotating a Web page with metadata describing that pages multimedia components is illustrated in more detail by the flow chart of FIG. 2. The process is entered at 31 and the first Web page to be annotated is selected from a collection of such web pages (for example, from the contents of a directory folder containing Web pages to be published on the Internet, optionally further including all other Web pages specified in links within Web pages using a "crawler"). The Web pages being indexed may be stored locally or fetched via the Internet.

The process of scanning or parsing each Web page is initialized at 33 and proceeds at 34. As indicated at 35, the scanning process searches the selected Web page for markup tags which specify multimedia content. The identification of multimedia tags may be performed by an conventional HTML, SGML or XML parser. For example, the standard Java class DocumentParser in the package javax.swing-.text.html.parser contained in the Java Platform 1.2 API Specification as promulgated by Sun Microsystems, Inc. 901 San Antonio Road, Palo Alto, Calif., 94303 may be used to parse HTML Web pages, and Oracle's XML Parser for Java v2, available from Oracle Corporation, 500 Oracle Parkway, Redwood Shores, Calif. 94065), may be used to identify multimedia tags in XML documents. The identification of multimedia tags may be performed as part of a concurrently performed process of validating the HTML, SGML, or XML pages (documents) prior to publication.

Alternatively, the text content of the web page may be directly scanned for the presence of tags which include the URLs of imbedded media files. For example, a case insensitive character scan may be performed for the specific HTML character strings which begin multimedia tags, such as: "<img" (images), "<a" (links to other web pages), "<form" (form handling programs), "<area" (image mapped links to other web pages), "<frame" (web pages loaded into frames), "<embed" (audio or video), "<sound" or <bgsound "(background audio). When each such tag is identified, the scanning process may then extract the URL placed in the tag in accordance with that tag's standard format. Note that, when the Web page includes an optional <base> tag containing a protocol and pathname, "local" URLs found within tags may be fully resolved by combining them with the separately specified base URL. Note also that the URL of the referenced media data may serve three separate purposes: it may be used to access the multimedia data from the identified resource so that additional descriptive metadata may be extracted for indexing and searching purpose, the filename extension in the URL may be used to determine the type of multimedia data to perform type-specific processing, and the URL itself constitutes metadata which may be useful for indexing and searching functions.

In addition to the URL, the markup tag which identifies multimedia may include additional information which describes how the media content is integrated into the web page. For example, "<img>" tags may also include optional parameters such as an "alt" parameter which specifies descriptive text to be displayed when, for some reason, the referenced image file cannot be rendered, and "height" and "width" parameters indicating the size of the image as displayed in the Web page. This descriptive information may be extracted to form part of the metadata about the referenced multimedia data which is later inserted into the Web page for indexing and searching as discussed later.

Still further information may be obtained from the file system directories which are maintained by the storage system which stores the multimedia data. Such directories typically contain time stamp information indicating when media data files were initially created and last modified. This information may be captured from the system directories and included as part of the metadata describing the multimedia data.

Finally, the content of the media data itself may contain information which can be expressed in text form as metadata. To capture such information, the type and format of the media data may be determined as indicated at 38 in FIG. 2 from the MIME type designation or a registered type designation associated with the filename extension in the URL, or by identifying format-identifying characteristics of the media data.

The media type when determined may be used to select a specific process at 40 for extracting descriptive information which from the content of the file. For example, common graphics file formats and the filename extension characters used to identify them are listed below:

| EXT. | DATA FORMAT |
|---|---|
| BIFF | XITE 3D file format |
| BMP | Microsoft Windows bitmap format |
| BW | SGI Black & White Image File Format |
| CGM | Computer Graphics Metafile |
| DRAW | Acorn's object-based vector image file format [Link] |
| DWG | AutoCAD drawings file format information [Link] |
| FAX | The Group 3 Facsimile standard |
| DCX | Format (graphics format for fax) |
| EPSF | Encapsulated Postscript Files |
| FIG | The FIG V3.1 file format (used by the xfig utility) |
| FITS | Flexible Image Transport System |
| GIF | Graphics Interchange Format |
| HDF | Hierarchical Data Format |
| ICC | Used for Kodak printer |
| IFF | Interchange Format |
| JPEG, JPG | JPEG File Interchange Format (V1.02) |
| MIFF | Machine Independent Format |
| NAP | The NAPLPS objected-oriented format |
| netCDF | The network Common Data Form |
| PIX | Used by SGI Alias/Wavefront products |
| PCX | Used by PC Paintbrush |
| PNG | Portable Network Graphics Specification |
| PBM | Enhanced Portable Bitmap toolkit |
| RLE | Utah Run Length Encoded Format |
| RAS | Sun Raster File Format |
| RGB/RGBA | SGI Colour Image File Format |
| SLD/SLB | AutoDesk Slide File Format |

-continued

| EXT. | DATA FORMAT |
|---|---|
| SLD | Slide File Format Specification |
| SLB | Slide Library File Format Specification |
| SPRITE | Acorn's bitmap format for their RISC OS |
| TGA | Targa File Format |
| TIFF | Tag Image File Format |
| VIFF | Used by the Khoros Visualisation package |
| X | The AVS Image Format |
| XBM | X BitMap Format |
| XPM | X PixMap Format |
| XWD | X Window Dump Format |

Audio files, such as ".wav" Wave files and ".mid" MIDI files, and video files, such as ".mpg" MPEG compressed video, are similarly indicated by the filename extension MIME type.

Using the URL in the markup tag to fetch the media file, and using the filename extension media-type specifier in the URL to select a media-format-type specific routine to extract descriptive information from the content of the identified media data, that descriptive information may then be appended at 42 to the other annotations which describe the media data.

The type-specific media extraction of metadata embedded in the digital media is performed at 40 according to the file format specifications for the particular type of media file being processed. The type-specific file format specifications define the structure of the media data and indicate where metadata of interest is located within the media data, allowing it to be extracted at 40, transformed into a standard text-based format, preferably XML, and appended to the other annotations at 42. The MIME type of the media source may be used to select, dynamically load and execute an appropriate, type-specific parsing routine adapted to extract desired metadata from media data of the identified mime-type. A set of standard parsers for use with widely used media types may be extensibly augmented by additional, user-defined parsers which may be "plugged into" the framework at run-time, thereby extending the range of media formats handled by the system.

The metadata extracted from the content of the media data is appended at 42 to the metadata previously obtained from other sources, including the markup tags which identified the media data, from system directories, and from other sources, such as keyboarded input accepted from a human editor and supplied in response to automatically generated prompts generated during the course of the annotation process.

In accordance with the invention, the combined metadata describing each of the various multimedia resources which are incorporated into the Web page being scanned are represented in text (character-based) form and inserted into the Web page to enhance its content as seen at 46 in FIG. 2. These inserted text annotations may advantageously conform to both the XML specification and to the *Resource Description Framework (RDF) Model and Syntax Specification*, a World Wide Web Consortium (W3C) Recommendation (available at http://www.w3.org/TR/REC-rdf-syntax). The RDF Recommendation introduces a model for representing metadata as well as a syntax for encoding this metadata in a manner that maximizes the interoperability of independently developed Web servers and clients. RDF uses the Extensible Markup Language XML and specifies semantics for data based on XML in a standardized, interoperable manner.

The extracted metadata is preferably classified in accordance with predefined annotation element types or predefined attributes of an element type. For example, the attribute names listed below may be used for enhancing the content of Web pages in accordance with the present invention. These listed attributes are also used in the Oracle interMedia Annotator, as disclosed in U.S. patent application Ser. No. 09/410,781 filed on Oct. 1, 1999 by Alok Srivistava, Paul Lin and Marco Carrer, the disclosure of which is incorporated herein by reference. That prior application describes the use of metadata describing multimedia data as used in XML annotations which are stored in a relational database for indexing and searching multimedia resources also stored in the database. See also, the *"Oracle8i inter-Media Audio, Image, and Video User's Guide and Reference."* Release 8.1.,5 Oracle Corporation, part number A67299-01, (1999).

| Attribute | Description |
|---|---|
| Generic Media Annotations | |
| MEDIATITLE | Title of the media |
| MEDIACOPYRIGHT | Copyright information of the media |
| EDIAPRODUCER | Producer of the media |
| MEDIADURATION | Duration (in seconds) of the media |
| MEDIACONTENT_DATE | Creation date of the media content |
| MEDIAMODIFICATION_TIME | Modification time of type Java.lang.Date |
| MEDIACREDITS | Credits for content providers |
| MEDIASIZE | Size of the media |
| MEDIAFORMAT_ENCODING | Format of the media |
| MEDIAUSER_DATA | String containing all user data |
| MEDIALANGUAGE | Language of the media |
| MEDIABITRATE | Bitrate of the media (in bits/second) |
| MEDIACATEGORY | Media category/genre |
| MEDIASOURCE_URL | Location/URL of the parsed media source |
| MEDIASOURCE_PROTOCOL | URL protocol of the media source |
| MEDIASOURCE_MIME_TYPE | MIME type of the media and its samples |
| MEDIASOURCE_DIRECTORY | Directory where the source is stored |
| MEDIASOURCE_FILENAME | Filename of the source |
| MEDIASOURCE_FILE_FORMAT | Media file format |
| MEDIAAUTHORING_TOOL | Software tool used to create the media |
| Audio Annotations | |
| AUDIOAUDIO_ARTIST | Main artist for the audio clip |
| AUDIOAUDIO_BITS_PER_SAMPLE | Number of bits per sample |
| AUDIOAUDIO_SAMPLE_RATE | Audio sample rate (in samples/second) |
| AUDIOAUDIO_NUM_CHANNELS | Number of audio channels |
| Image and Video Annotations | |
| VIDEOFRAMERATE | Video frame rate (in frames/second) |
| VIDEOFRAMESIZE | Video frame size (in bytes) |
| VIDEOSRCHEIGHT | Video height (in pixels) |
| VIDEOSRCWIDTH | Video width (in pixels) |
| VIDEOHORIZONTALRES | Horizontal resolution (in pixels/inch) |
| VIDEOVERTICALRES | Vertical resolution (in pixels/inch) |
| VIDEOISGRAYSCALE | Whether the video has colors |
| VIDEO_DEPTH | Number of bits for the color depth |

While the above-noted attribute names and meanings may be used to particular advantage in those systems which employ like attribute names, such as the interMedia Text Engine, automated routines which generate annotations having different or additional attribute and element names may be used. The selection of a particular schema is made to best integrate the operation of the annotation-generating preprocessor with the operation of existing indexing and searching facilities.

When all of the Web pages in the collection have been enhanced with inserted annotations describing the included multimedia data, as determined at 48 in FIG. 2, the annotated Web page copies may then be indexed as indicated at 50 in conventional ways. Simply making such enhanced Web pages available on the Web allows them to be indexed by existing automated search engines ("Web crawlers" or "spiders") such as those used by the indexes are publicly available at www.hotbot.com, www.altavista.com, www.excite.com, www.lycos.com, etc. Alternatively, the enhanced Web pages may be indexed for local use using conventional indexing mechanisms, and then discarded, leaving only the original Web page in storage, thereby conserving storage space and reducing Web page transport times. Note that, after indexing is completed, the URL of each indexed Web page which is supplied to users by the indexing or searching facilities should be the URL of an available Web page and not the URL of a discarded original or copy that is no longer available because it was discarded.

CONCLUSION

It is to be understood that the specific embodiment of the invention which has been described is merely illustrative of one application of the principles of the invention. Numerous modifications may be made to the system described without departing from the true spirit and scope of the invention.

What is claimed is:

1. Apparatus for indexing a Web page which incorporates multimedia data by reference to one or more resources which supply said multimedia data, said method comprising, in combination:

means for analyzing said web page to identify at least one markup tag containing a reference to a given one of said resources, means for selecting and executing a media processing program for analyzing the content of the multimedia data supplied by said given one of said resources to generate metadata describing said content, means for formatting said metadata into a character-based text annotation, means for combining said Web page and said annotation to form an enhanced Web page, and means for indexing said enhanced Web page.

2. Apparatus as set forth in claim 1 wherein said means for selecting and executing a media processing program comprises means for determining the particular data type of the multimedia data supplied by said given resource and means for selecting a processing program for analyzing multimedia data formatted in accordance with said particular data type.

3. Apparatus as set forth in claim 1 wherein said means for formatting said metadata comprises means for generating a text data annotation expressed in accordance with the Extensible Markup Language.

4. Apparatus as set forth in claim 1 including means for acquiring additional metadata which describes the multimedia data supplied by said given one of said resources from a source other than the content of said multimedia data, and means for including said additional metadata in said character-based text annotation.

5. Apparatus as set forth in claim 4 wherein at least some of said additional metadata includes information obtained from said one markup tag.

6. Apparatus as set forth in claim 4 wherein said given resource is accessed through the operating system of a computer which provides said given resource and wherein at least some of said additional metadata includes information obtained from said operating system.

7. Apparatus as set forth in claim 4 wherein at least some of said additional metadata s obtained via the Internet.

8. Apparatus for collecting and storing metadata describing a hypertext Web page, said Web page including markup tags which identify multimedia data from one or more different external resources, said apparatus comprising, in combination,
   a parser for identifying said markup tags in said Web page,
   processing means for analyzing the content of said multimedia data identified by said markup tags to generate metadata describing said multimedia data,
   means for translating said metadata into a character-based text annotation describing said multimedia data, and
   means for storing the combination of a copy of said Web page and said annotation to form an enhanced Web page suitable for processing by text-based indexing and searching facilities.

9. Apparatus as set forth in claim 8 wherein said text annotation is expressed in the Extensible Markup Language.

10. The method of automatically enhancing the content of a Web page which contains multimedia data incorporated by reference which comprises, in combination, the steps of:
    identifying one or more markup tags in said Web page which respectively identify one or more external resources which provide said multimedia data;
    generating metadata which de scribes said multimedia data,
    translating said metadata into a character-based text annotation, and
    inserting said annotation into said Web page to form an enhanced Web page suitable for processing by a character-based text processing system.

11. The method of automatically enhancing the content of a Web page as set forth in claim 10 wherein said step of identifying one or more markup tags comprises the steps of first identifying markup tags in said Web page and extracting the uniform resource locator (URL) of one of said external resources from at least selected ones of said markup tags.

12. The method of automatically enhancing the content of a Web page which contains multimedia data as set forth in claim 10 wherein said step of generating metadata includes the sub-steps of retrieving said multimedia data from said one or more external resources and analyzing the content of said multimedia data to extract said metadata there from.

13. The method of automatically enhancing the content of a Web page as set forth in claim 12 wherein said step of generating metadata comprises the sub-steps of identifying the data type of the multimedia data from each of said resources and then selecting a processing routine for multimedia of the identified data type from each of said resources.

14. The method of automatically enhancing the content of a Web page as set forth in claim 10 includes the further step of indexing said enhanced Web page to provide access to said Web page in response to queries expressing one or more attributes expressed in said text annotation.

15. The method of automatically enhancing the content of a Web page as set forth in claim 10 includes the further step of searching the content of said enhanced Web page in response to a search request to determine if attributes expressed in said search request are contained in said text annotation.

16. The method of automatically enhancing the content of a Web page as set forth in claim 13 includes the further step of indexing said enhanced Web page to provide access to said Web page in response to queries expressing one or more attributes expressed in said text annotation.

17. The method of automatically enhancing the content of a Web page as set forth in claim 13 includes the further step of searching the content of said enhanced Web page in response to a search request to determine if attributes expressed in said search request are contained in said text annotation.

* * * * *

UNITED STATES PATENT AND TRADEMARK OFFICE
CERTIFICATE OF CORRECTION

| | | |
|---|---|---|
| PATENT NO. | : 7,162,691 B1 | Page 1 of 1 |
| APPLICATION NO. | : 09/496086 | |
| DATED | : January 9, 2007 | |
| INVENTOR(S) | : Chatterjee et al. | |

It is certified that error appears in the above-identified patent and that said Letters Patent is hereby corrected as shown below:

On sheet 2 of 2, in Figure 2, Ref. Numeral 35, line 1, delete "Mulitmedia" and insert -- Multimedia --, therefor.

On sheet 2 of 2, in Figure 2, Ref. Numeral 42, line 2, delete "annnotations" and insert -- annotations --, therefor.

In column 3, line 27, delete "(i.e," and insert -- (i.e., --, therefor.

In column 4, line 38, delete "an" and insert -- a --, therefor.

In column 4, line 46, delete "94065)," and insert -- 94065, --, therefor.

In column 7, line 8, delete "Srivistava," and insert -- Srivastava, --, therefor.

In column 9, line 10, in claim 7, delete "s" and insert -- is --, therefor.

In column 9, line 35, in claim 10, delete "de scribes" and insert -- describes --, therefor.

In column 10, line 10, in claim 12, delete "there from." and insert -- therefrom. --, therefor.

Signed and Sealed this

Twenty-seventh Day of July, 2010

David J. Kappos
*Director of the United States Patent and Trademark Office*